Oct. 8, 1929.　　　L. W. BEMAN　　　1,730,345
SUPPLY HOLDER FOR KITCHEN TABLES
Filed Nov. 9, 1925
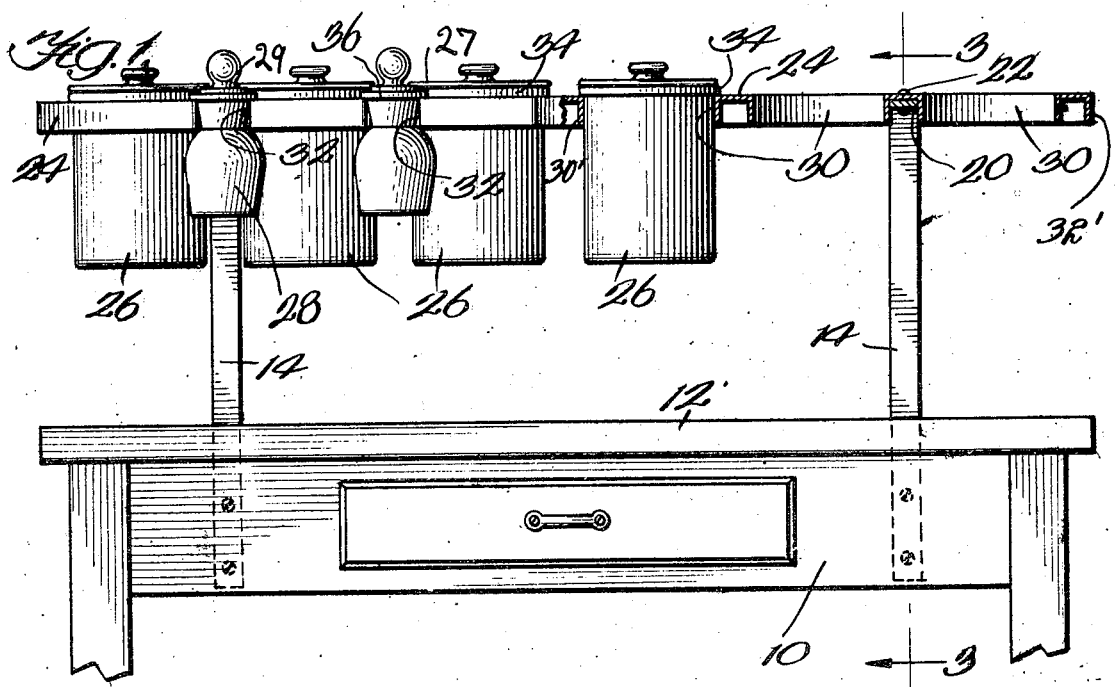
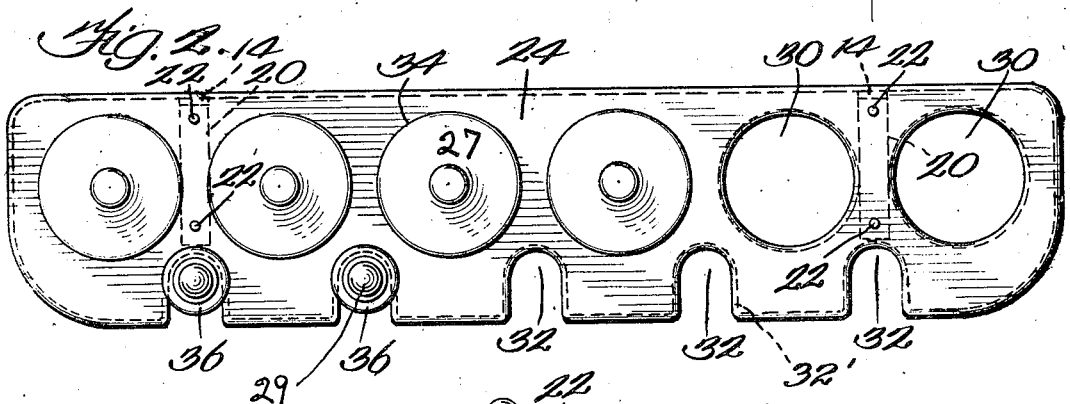
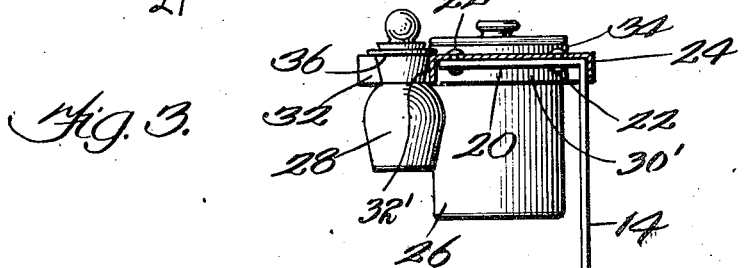
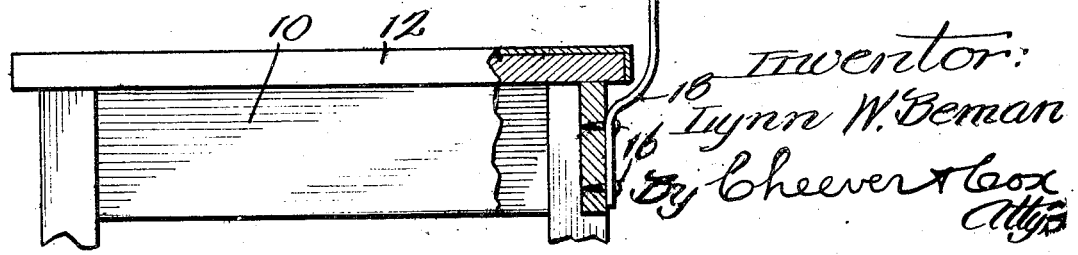
Inventor:
Lynn W. Beman
By Cheever & Cox
Attys.

Patented Oct. 8, 1929

1,730,345

UNITED STATES PATENT OFFICE

LYNN W. BEMAN, OF CHICAGO, ILLINOIS

SUPPLY HOLDER FOR KITCHEN TABLES

Application filed November 9, 1925. Serial No. 67,766.

Kitchen cabinets, comprising a table having a rear wall rising directly therefrom, carrying supply receptacles, have been in use many years and are generally condemned by home economics experts who recommend the use of a central, wholly detached mixing or other working table to which supplies are brought on a tray, cafeteria style, from sources of supply around the room, a system which imposes an annoying amount of extra work on the operator.

The objects of this invention are to obviate both the above objectionable structures or systems; to provide a unitary structure for supporting a multiplicity of receptacles for various materials used in cooking, which can be readily applied to and removed from a kitchen table in such a manner that the table, itself, can be maintained in an absolutely clean condition, without interference by the device in question; the receptacles being within easy reach of the operator and just high enough above the table so that usual working utensils can be placed at any point on the table without contacting any material receptacle; to make the receptacles of transparent material, so that the operator can see the amount of material in each receptacle and on depletion order a fresh supply; to so suspend the material receptacles that their sides and bottoms can be wiped and cleaned without disturbing the receptacle in the support or holder; and, finally, to so mount the material receptacles that material may, if desired, be removed from the larger receptacles without taking such receptacles out of the holder.

The invention consists in means attaining the foregoing and other objects, easily and cheaply constructible, satisfactory in use and not liable to get out of order. More in detail, the invention consists in a shelf or rack, preferably but not necessarily of metal, provided with perforations and indentations for the reception of glass cooking material receptacles, this in combination with supports of proper height for maintaining the device at a distance above and entirely clear of a kitchen table, which can be readily cleaned without interference from or by the device of this invention.

Referring to the drawings in which like numerals represent the same parts throughout the several views:

Figure 1 is a side elevation of the device of this invention.

Figure 2 is a plan view of the mechanism removed from the table.

Figure 3 is an end view partially in section on the line 3—3 of Figure 1.

In the device of this invention, a kitchen table 10 is provided, having a top 12 which is clear on all sides and edges, regardless of the device of this invention, which is attached to the table by only two uprights 14, secured to the body of the table 10 by bolts or screws 16 entering the side of the table body and below the top 12, the uprights, as clearly shown in Figure 3, entirely clearing the table top 12 at the curves 18.

The upper ends of uprights 14 are provided with horizontally extending brackets 20 sustaining and having rigidly secured thereto by bolts or rivets 22 the metal shelf 24 of convenient size and shape to receive a multiplicity of large material receptacles 26 and a less number of smaller receptacles 28. All the receptacles are preferably, but not necessarily of glass.

The shelf 24 is provided with a row of perforations 30, each of proper size and shape to receive the large receptacles 26 and with intermediate notches 32 adapted to receive the smaller receptacles 28, as shown. The large receptacles 26 are provided with neck flanges 34, each adapted to engage the portion of shelf 24 which borders a perforation 30. Each small receptacle 28 is correspondingly provided with a neck flange 36 adapted to correspondingly engage a portion of shelf 24 bordering a notch 32. These neck flanges allow the receptacle to settle well below the shelf so the lower and also cover portions of the receptacles can be easily wiped clean while in place, and the amount of contents can be readily observed by an operator in front of the table. Support 14 is high enough so that usual cooking utensils on table top 12 can pass under the bottoms of receptacles 26.

Each perforation 30 is surrounded by a depending flange 30' and these flanges not only act to strengthen the shelf 24, but in addition serve as a guide for the insertion and removal of receptacles to and from the perforations. Furthermore, with these flanges present the shelf can be constructed of very thin material with corresponding saving of cost, the flanges under such conditions serving to impart the necessary strength to the shelf and prevent distortion thereof around the perforations when attempt is made to forcibly insert and remove receptacles in a direction inclined to the vertical, all as will be obvious. The shelf 24 is further strengthened by a depending flange 32' of an endless character extending around the entire edge of the shelf and of course contiguous with each notch 32.

In the operation of the device, the shelf 24 and the uprights 14 are sold to the table manufacturer or to the housewife, as the case may be, as a separate unit for attachment to any sort of a table 10, in the manner described. The glass receptacles 26 and 28 are usually, and preferably, sold with the shelf, but may be bought as separate equipment, if desired. The purchaser of the equipment applies the uprights 14 to the table 10 with the curves 18 clearing the table top as shown, and in the operation of preparing food or the like, removes the covers 27 of receptacles 26, one at a time, or otherwise, as desired, for the purpose of taking out part of the contents thereof and placing the same in the food mixture being prepared upon the table top 12. If receptacles 28 are large, the same method may be used, otherwise, each entire receptacle is pulled out of its notch, its cover 29 removed and some of the contents extracted, and, after such removal, the receptacle is replaced in the proper place on the shelf 24. When the food mixture, prepared on table top 12, is finally disposed of, the operator can take a cloth or other cleaning equipment, pass it over the table top 12 and all edges thereof without interference by the upright 14.

The equipment thus produced is cheaper than buying a conventional kitchen cabinet and the special mechanism of this invention can be applied to any table which may be in the possession of the purchaser of the equipment.

From the foregoing disclosure, it will be seen that:

This is the only device in which the worker has the clear table top with the supply holder within arm's reach; it is the only supply holder which holds supplies suspended over clear working table top at any point, leaving space enough between top of table and bottom of jars to be able to place working utensils on all parts of table top; it is truly a supply holder, not a cabinet, which places supplies within easy arm's reach of a worker at clear table top so that any material is taken from holder without removing and replacing containers; the supplies take no space on working table, thus adding speed, saving waste of spilling and keeping worker's space free on top.

It is the only supply holder which automatically reminds the housekeeper to refurnish when low, without any lists, etc. (Glass jars suspended below the holder are in full view of the worker at all times and she can see when the supply is getting low.)

It is the only supply holder in which bottoms of jars are not resting on some shelf, frame or support. This makes this much more sanitary as when in measuring out supplies, any spilled material falls on clear table top below, it may be quickly wiped up as here there are no corners nor spaces between supply packages to be cleaned out. If any material fall on shelf in which the jars are suspended, this is also flat surface and glass jar tops which are without corners and quickly cleaned.

It is the only supply holder which keeps goods in sanitary dust proof, insect proof, moisture proof containers which are always within easy arm's reach of worker at kitchen table without handling and are at this point always stationary which means in place, ready for instant use, in good condition. This gives accuracy and speed to worker.

It is the only supply holder not a cabinet which is fastened to a kitchen table and has all the features above, is not fastened to wall, and can be moved anywhere the table is moved.

Having thus described my invention, what I claim as new and desire to secure by Letters Patent is:

1. A receptacle carrying shelf comprising a plate having a plurality of perforations therein adapted to receive receptacles to be supported by the plate, a depending flange surrounding each perforation serving to both strengthen the plate and guide a receptacle during insertion and removal into and from a perforation, an endless depending flange following the edge of the plate and having its outer face flush with said plate edge, and a plurality of similar two-arm angular brackets having corresponding arms secured to the plate against the under side of the latter and their other corresponding arms adapted to be secured to a table whereby said shelf may be supported above such table, the arms of said brackets which are secured to the plate passing between depending flanges surrounding adjacent perforations with their side edges in engagement with said flanges, and with their ends in engagement with said endless depending edge flange.

2. An attachment for a table top comprising two relatively narrow supports adapted to be attached to a table, said supports having horizontal upper ends, a shelf mounted on said supports whereby said shelf is adapted to extend longitudinally of and over the rear portion of the table, said shelf having a plurality of relatively large openings therethrough which are spaced apart and longitudinally of the shelf to receive a plurality of jars having upper peripheral projections whereby said jars may be suspended from the shelf, and the forward edge of said shelf having a plurality of marginal notches each notch lying opposite the space between adjacent openings said notches being adapted to receive additional smaller jars and for suspending the jars therefrom, and said shelf being sufficiently elevated above the table top when the supports are attached to the table so as to permit utensils of considerable height when placed on the table to pass beneath the suspended jars.

3. A receptacle carrying shelf having a plurality of perforations therein adapted to receive receptacles to be supported by the plate, said shelf being formed with flanges surrounding each perforation serving both to strengthen the shelf and to guide a receptacle during insertion and removal into and from a perforation, said shelf having an endless, depending flange following the edge thereof, and having its outer face flush with said shelf edge, and a plurality of similar two-arm, angular brackets having corresponding arms secured to the shelf against the under side thereof and their other corresponding arms being arranged to be secured to a table whereby said shelf may be supported above such table, the bottoms of said brackets which are secured to the shelf passing between depending flanges surrounding adjacent performations and with their side edges in engagement with said latter flanges and with their ends in engagement with said endless depending edge flange.

In witness whereof, I have hereunto subscribed my name.

LYNN W. BEMAN.